US012027083B2

(12) United States Patent
Shi et al.

(10) Patent No.: US 12,027,083 B2
(45) Date of Patent: Jul. 2, 2024

(54) METHOD FOR DETECTING DISPLAY DEVICE

(71) Applicant: BOE TECHNOLOGY GROUP CO., LTD., Beijing (CN)

(72) Inventors: Xiaodong Shi, Beijing (CN); Chao Yu, Beijing (CN); Xingqun Jiang, Beijing (CN); Quanzhong Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 426 days.

(21) Appl. No.: 17/298,142

(22) PCT Filed: Nov. 3, 2020

(86) PCT No.: PCT/CN2020/126192
§ 371 (c)(1),
(2) Date: May 28, 2021

(87) PCT Pub. No.: WO2021/088809
PCT Pub. Date: May 14, 2021

(65) Prior Publication Data

US 2022/0051596 A1 Feb. 17, 2022

(30) Foreign Application Priority Data

Nov. 8, 2019 (CN) ......................... 201911093876.4

(51) Int. Cl.
*G01R 33/00* (2006.01)
*G09G 3/00* (2006.01)
*G09G 3/32* (2016.01)

(52) U.S. Cl.
CPC ............... *G09G 3/006* (2013.01); *G09G 3/32* (2013.01); *G09G 2320/0693* (2013.01); *G09G 2330/12* (2013.01)

(58) Field of Classification Search
CPC .......... G01R 33/00; G09G 3/006; G09G 3/32; G09G 2320/0693; G09G 2330/12
See application file for complete search history.

(56) References Cited

U.S. PATENT DOCUMENTS

2002/0075288 A1 * 6/2002 Matsumura ........ H04N 21/4122 348/E17.005
2014/0240375 A1 8/2014 Ha
(Continued)

FOREIGN PATENT DOCUMENTS

CN 104217684 A 12/2014
CN 104318879 A 1/2015
(Continued)

OTHER PUBLICATIONS

European Patent Office, EESR, Dec. 6, 2022, EP application 20885945.4.
China Patent Office, Office Action rejection, Jan. 5, 2023, Chinese application 201911093876.4.
China Patent Office, First Office Action dated Mar. 16, 2022, for corresponding Chinese application 201911093876.4.

*Primary Examiner* — Jermele M Hollington
*Assistant Examiner* — Taqi R Nasir
(74) *Attorney, Agent, or Firm* — HOUTTEMAN LAW LLC

(57) ABSTRACT

The present disclosure provides a method for detecting a display device. The method includes: sending a first instruction to a display device to enable all display sub-screens of the display device display a first test picture; judging whether all the display sub-screens meet the display standard or not according to a display condition of the first test picture; in response to that at least one display sub-screen does not meet the display standard, performing a first reset operation on the display sub-screen, and enabling the display sub-screen subjected to the first reset operation to (Continued)

display the first test picture again; judging whether the display sub-screen displaying the first test picture again meets the display standard or not; and in response to that the display sub-screen displaying the first test picture again does not meet the display standard, replacing the display sub-screen by using a standby display sub-screen.

18 Claims, 3 Drawing Sheets

(56) References Cited

U.S. PATENT DOCUMENTS

| | | | | |
|---|---|---|---|---|
| 2016/0112702 | A1 | 4/2016 | Qian et al. | |
| 2017/0155897 | A1 | 6/2017 | Wang et al. | |
| 2017/0208655 | A1* | 7/2017 | Lee | G01R 31/44 |
| 2018/0189725 | A1 | 7/2018 | Mattingly et al. | |
| 2018/0267758 | A1* | 9/2018 | Zhao | G09G 3/006 |

FOREIGN PATENT DOCUMENTS

| | | | |
|---|---|---|---|
| CN | 104347022 | A | 2/2015 |
| CN | 104572328 | A | 4/2015 |
| CN | 104598181 | A | 5/2015 |
| CN | 104867432 | A | 8/2015 |
| CN | 206097857 | A | 4/2017 |
| CN | 107103867 | A | 8/2017 |
| CN | 108663374 | A | 10/2018 |
| CN | 207978062 | U | 10/2018 |
| CN | 110189670 | A | 8/2019 |
| JP | 2009135684 | A | 6/2009 |
| JP | UP2011065301 | A | 3/2011 |

* cited by examiner

METHOD FOR DETECTING DISPLAY DEVICE

CROSS-REFERENCE TO RELATED APPLICATIONS

The present application claims the priority of Chinese Patent Application No. 201911093876.4, filed on Nov. 8, 2019, the contents of which are incorporated herein in their entirety by reference.

TECHNICAL FIELD

The present disclosure relates to the technical field of display detection, and particularly relates to a method for detecting a display device.

BACKGROUND

As a new display technology, a transparent LED (light emitting diode) display screen has advantages of flexible shape, low cost, high transparency, good heat dissipation, portability, etc., and thus is now widely used in the commercial field (especially in the field of large celebration performances), for example, it may be used for display on glass curtain walls, in shop windows, in large artistic performances, and so on.

Specifically, a transparent LED display screen may be composed of a plurality of display sub-screens, each display sub-screen includes a plurality of LED light bars, each LED light bar includes a plurality of LED light beads, and by making each LED light bead emit light at a preset brightness, all LED light beads can be made to display a preset picture together.

In a plurality of application scenes of the transparent LED display screen, the most complicated scene is a large-scale artistic performance scene, the transparent LED display screen in the large-scale artistic performance scene generally consists of hundreds of display sub-screens, thousands of display sub-screens or even tens of thousands of display sub-screens, and if some display sub-screens displays abnormally or black in the performance process, the performance effect is influenced, and even the performance fails.

SUMMARY

In a first aspect, an embodiment of the present disclosure provides a method for detecting a display device, where the display device includes a plurality of display sub-screens, and the method includes:

- sending a first instruction to the display device to enable all the display sub-screens of the display device display a first test picture;
- judging whether all the display sub-screens meet a display standard or not according to a display condition of the first test picture;
- in response to that at least one display sub-screen does not meet the display standard, performing a first reset operation on the display sub-screen which does not meet the display standard, and enabling the display sub-screen subjected to the first reset operation to display the first test picture again;
- judging whether the display sub-screen displaying the first test picture again meets the display standard or not according to the display condition of the first test picture displayed again; and
- in response to that the display sub-screen displaying the first test picture again does not meet the display standard, replacing the display sub-screen which does not meet the display standard by using a standby display sub-screen.

In some implementations, each of the display sub-screens includes a plurality of display lamps, and after sending the first instruction to the display device to enable all the display sub-screens of the display device display the first test picture, the method further includes: judging whether the display lamps of all the display sub-screens normally emit light or not according to the display condition of the first test picture; and in response to that at least one display lamp of at least one display sub-screen abnormally emits light, replacing the display lamp abnormally emitting light by using a standby display lamp.

In some implementations, the display lamp is an LED light bead.

In some implementations, the display device is a transparent LED display device.

In some implementations, the sending the first instruction to the display device includes: sending the first instruction to the display device through a base station.

In some implementations, before sending the first instruction to the display device enable all the display sub-screens of the display device display the first test picture, the method further includes: storing the first test picture into a storage element of the display device.

In some implementations, after replacing the display sub-screen that does not meet the display standard with the standby display sub-screen in response to that the display sub-screen displaying the first test picture again still does not meet the display standard, the method further includes: sending a second instruction to the display device to enable all the display sub-screens of the display device to display a second test picture; judging whether all the display sub-screens meet the display standard or not according to a display condition of the second test picture; in response to that at least one display sub-screen does not meet the display standard, performing a second reset operation on the display sub-screen which does not meet the display standard, and enabling the display sub-screen subjected to the second reset operation to display the second test picture again; and sending a third instruction to the display device to enable all the display sub-screens to enter a display preparation stage.

In some implementations, after sending the second instruction to the display device to enable all the display sub-screens of the display device display the second test picture, the method further includes: judging whether display lamps of all the display sub-screens normally emit light or not according to the display condition of the second test picture; and in response to that at least one display lamp of at least one display sub-screen abnormally emits light, replacing the display lamp abnormally emitting light by using a standby display lamp.

In some implementations, before sending the second instruction to the display device to enable all the display sub-screens of the display device display the second test picture, the method further includes: storing the second test picture into the storage element of the display device.

In some implementations, after sending the third instruction to the display device to enable all the display sub-screens to enter the display preparation stage, the method further includes: sending a fourth instruction to the display device to enable all the display sub-screens to sequentially display a plurality of working pictures in a plurality of working stages; in response to that at least one of the display sub-screens displays abnormally in at least one of the working stages, performing a third reset operation on the display sub-screen displaying abnormally, and enabling the display sub-screen subjected to the third reset operation to display a corresponding one of the working pictures in a next one of the working stages.

In some implementations, before sending the fourth instruction to the display device to enable all the display sub-screens to sequentially display the plurality of working pictures in the plurality of working stages, the method further includes: storing the plurality of working pictures into the storage element of the display device.

In some implementations, a time to start displaying the first test picture is 13 to 17 minutes prior to a time to start displaying the working picture.

In some implementations, a time to start displaying the second test picture is 1 to 2 minutes prior to a time to start displaying the working picture.

DESCRIPTION OF DRAWINGS

The accompanying drawings, which are included to provide a further understanding of the present disclosure and are incorporated in and constitute a part of the specification, illustrate embodiments of the present disclosure and together with the description serve to explain the present disclosure, but do not constitute a limitation of the present disclosure. In the drawings.

DESCRIPTION OF EMBODIMENTS

Figure 1:
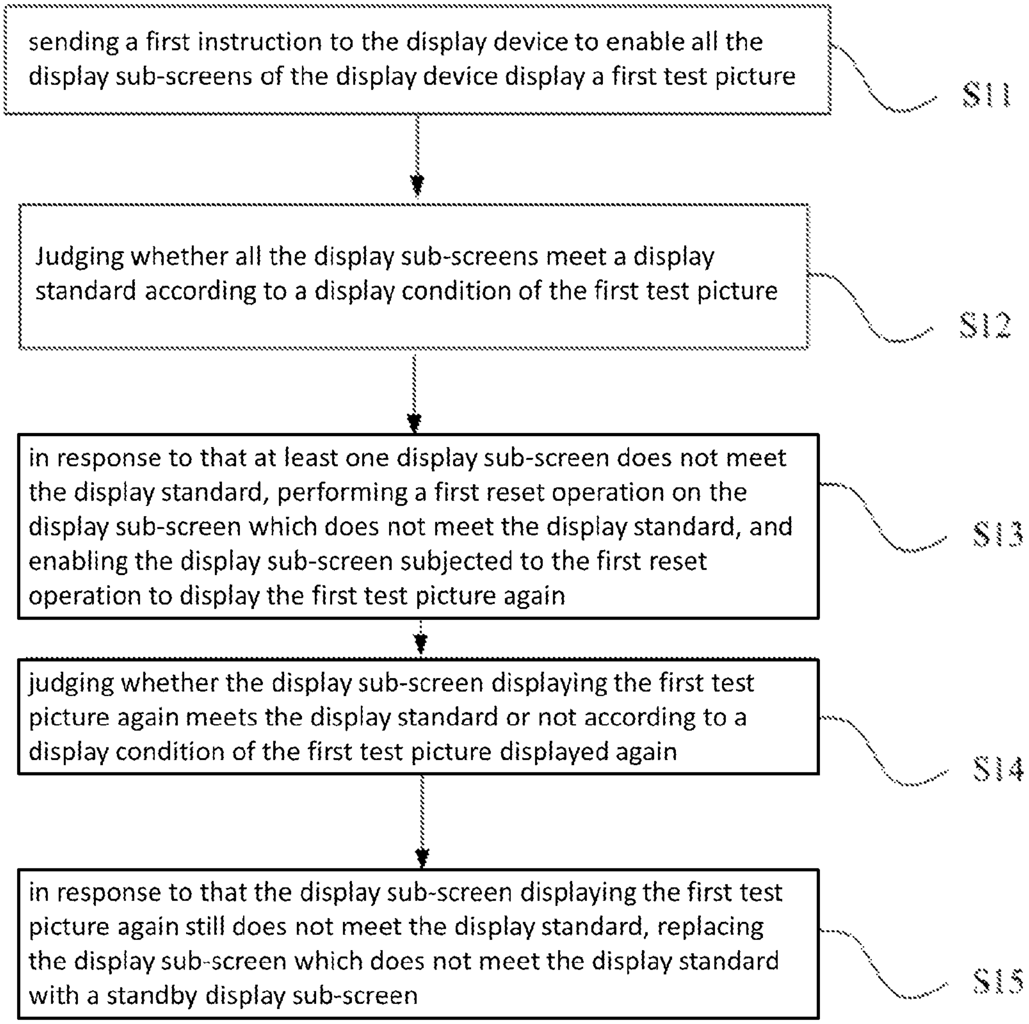
FIG. 1 is a schematic flowchart illustrating a method for detecting a display device according to an embodiment of the present disclosure.

In order that those skilled in the art will better understand technical solutions of the present disclosure, the following detailed description is given with reference to the accompanying drawings and the specific implementations.

The present disclosure will be described in more detail below with reference to the accompanying drawings. In the various figures, like elements are identified with the same or similar reference numerals. For purposes of clarity, the various features in the drawings are not drawn to scale. Moreover, certain well-known elements may not be shown in the figures.

Numerous specific details of the present disclosure, such as structures, materials, dimensions, processing techniques and techniques of the components, are set forth in the following description in order to provide a more thorough understanding of the present disclosure. However, as will be understood by those skilled in the art, the present disclosure may be practiced without these specific details.

As shown in FIG. 1, an embodiment of the present disclosure provides a method for detecting a display device, where the display device includes a plurality of display sub-screens.

Specifically, the display device to which the method of the embodiment of the present disclosure is applicable is composed of a plurality of display sub-screens, that is, each display sub-screen displays a part of a whole picture, and when each display sub-screen displays normally, the pictures displayed by all the display sub-screens form the whole picture; and the work of each display sub-screen is relatively independent, namely, whether one of the display sub-screens is normal or not is irrelevant to other display sub-screens.

The method of the embodiment of the present disclosure may include the following steps S11 to S15.

At S11, sending a first instruction to the display device to enable all the display sub-screens of the display device display a first test picture.

That is, the first instruction is sent to the display device, so that all the display sub-screens of the display device display a same picture at the same time, namely, the first test picture.

In the embodiment of the present disclosure, the first test picture may be a pure color picture of a specific color, for example, a pure color picture of white, black, blue, green, red, or yellow.

Moreover, in the embodiment of the present disclosure, the reference to "the same time" may have a certain margin, and the "same picture" may have a certain tolerance.

For example, the display sub-screens can be regarded as displaying the picture at the same time as long as a difference between times when the display sub-screens display the picture is not greater than a preset time duration, and the display sub-screens can be regarded as displaying the same picture as long as a color difference between the pictures displayed by the display sub-screens is not greater than a preset color difference. The preset time duration and the value of the preset color difference may be set as needed, which is not specifically limited by the present disclosure. For example, the preset time duration may be set such that when the difference between the times when the display sub-screens display the picture is not greater than the preset time duration, the difference between the times when the display sub-screens display the picture cannot be perceived or can be tolerated by human's eyes; the value of the preset color difference may be set such that when the color difference between pictures displayed by the display sub-screens is not greater than the preset color difference, the difference between the pictures displayed by the display sub-screens cannot be perceived or can be tolerated by human's eyes.

At S12, judging whether all the display sub-screens meet a display standard according to a display condition of the first test picture.

Specifically, when each display sub-screen displays a picture, a signal including relevant information such as an actual display time of the display sub-screen displaying the picture and an attribute (for example, color) of an actual displayed picture may be generated, and whether the display sub-screen meets the display standard may be determined by analyzing the signal.

For example, whether the display sub-screen meets the display standard can be judged by comparing the actual display time of the display sub-screen for displaying the first test picture with a preset display time of the first test picture, and in response to that a difference between the actual display time of the display sub-screen for displaying the first test picture and the preset display time of the first test picture is greater than a first preset value, the display sub-screen can be regarded as not meeting the display standard. Certainly, it may also be judged whether the display sub-screen meets the standard by comparing an attribute of the actual displayed picture of the display sub-screen displaying the first test picture with a preset attribute of the first test picture, and in response to that a difference between the attribute of the actual displayed picture of the display sub-screen displaying the first test picture and the preset attribute of the first test picture is greater than a second preset value, for example, in response to that the difference between a color of the actual displayed picture of the display sub-screen displaying the first test picture and a preset color of the first test picture is greater than the second preset value, it is determined that the display sub-screen does not meet the display standard.

For example, differences between the actual display times of the display sub-screens when human's eyes perceive that the display sub-screens display the first test picture at the same time may be counted in advance, and an average value of the differences may be used as the first preset value, and in response to that the difference between the actual display time when the display sub-screen displays the first test picture and the preset display time of the first test picture is greater than the first preset value, the display sub-screen can be regarded as not meeting the display standard; differences between attributes of actual displayed pictures of the display sub-screens when human's eyes perceive that the display sub-screens display the first test picture at the same time may also be counted in advance, an average value of the differences may be used as the second preset value, and in response to that the difference between the attribute of the actual displayed picture of the display sub-screen displaying the first test picture and the preset attribute of the first test picture is greater than the second preset value, the display sub-screen is determined not to meet the display standard.

It should be understood that if the display sub-screen does not generate a signal including relevant information such as the actual display time of the display sub-screen displaying the picture and the attribute (for example, color) of the actual displayed picture, it may be that the display sub-screen cannot display and thus the display sub-screen does not meet the display standard.

In addition, picture sizes that the display sub-screens should display may also be considered, for example, in response to that an amount by which the picture size actually displayed by the display sub-screen (for example, the picture size of the first test picture actually displayed) is smaller than the picture size that the display sub-screen should display (for example, a preset size of the first test picture) exceeds a preset amount, for example, by 5% or more, it is considered that the display sub-screen does not completely display the first test picture and does not meet the display standard. It should be understood that the preset amount may be preset in advance as needed, and in principle, the minimum amount by which the picture size actually displayed by the display sub-screen is smaller than the picture size that the display sub-screen should display when the display sub-screen is regarded, by human's eyes, as not completely displaying the first test picture may be determined as the preset amount.

Certainly, one or more factors described above may be considered to judge whether the display sub-screen meets the display standard, which is not specifically limited by the present disclosure.

At S13, in response to that at least one display sub-screen does not meet the display standard, performing a first reset operation on the display sub-screen which does not meet the display standard, and enabling the display sub-screen subjected to the first reset operation to display the first test picture again.

The performing the first reset operation on the display sub-screen that does not meet the display standard is equivalent to performing a "hot start" on the display sub-screen. Specifically, the present disclosure does not limit a specific manner of performing the first reset operation on the display sub-screen that does not meet the display standard, for example, the first reset operation may be performed on the display sub-screen that does not meet the display standard by a controller of the display device, or the first reset operation may be performed on the display sub-screen that does not meet the display standard by displaying a prompt information through the display device to prompt a worker to press a reset key corresponding to the display sub-screen that does not meet the display standard.

At S14, judging whether the display sub-screen displaying the first test picture again meets the display standard or not according to a display condition of the first test picture displayed again.

Specifically, the display sub-screen that displays the first test picture again may still generate a signal including relevant information such as an actual display time of the display sub-screen displaying the first test picture again and an attribute of the actual displayed picture, and whether the display sub-screen that displays the first test picture again meets the display standard may be determined by analyzing the signal, and details may refer to the relevant description for step S12, which is not described herein again.

At S15, in response to that the display sub-screen displaying the first test picture again still does not meet the display standard, replacing the display sub-screen which does not meet the display standard with a standby display sub-screen.

That is, in response to that the display sub-screen subjected to the first reset operation still cannot normally display, it is considered that the display sub-screen is damaged, and thus the display sub-screen can be replaced.

In the method for detecting the display device according to the embodiment of the present disclosure, by determining whether the display sub-screen meets the display standard, performing the first reset operation on the display sub-screen that does not meet the display standard, enabling the display sub-screen subjected to the first reset operation to display the first test picture again, and judging whether the display sub-screen that displays the first test picture again meets the display standard, the display sub-screen that displays abnormally or is damaged can be found out to the maximum extent, and can be corrected or replaced, thereby ensuring that the display device can normally display afterwards.

Figure 2:
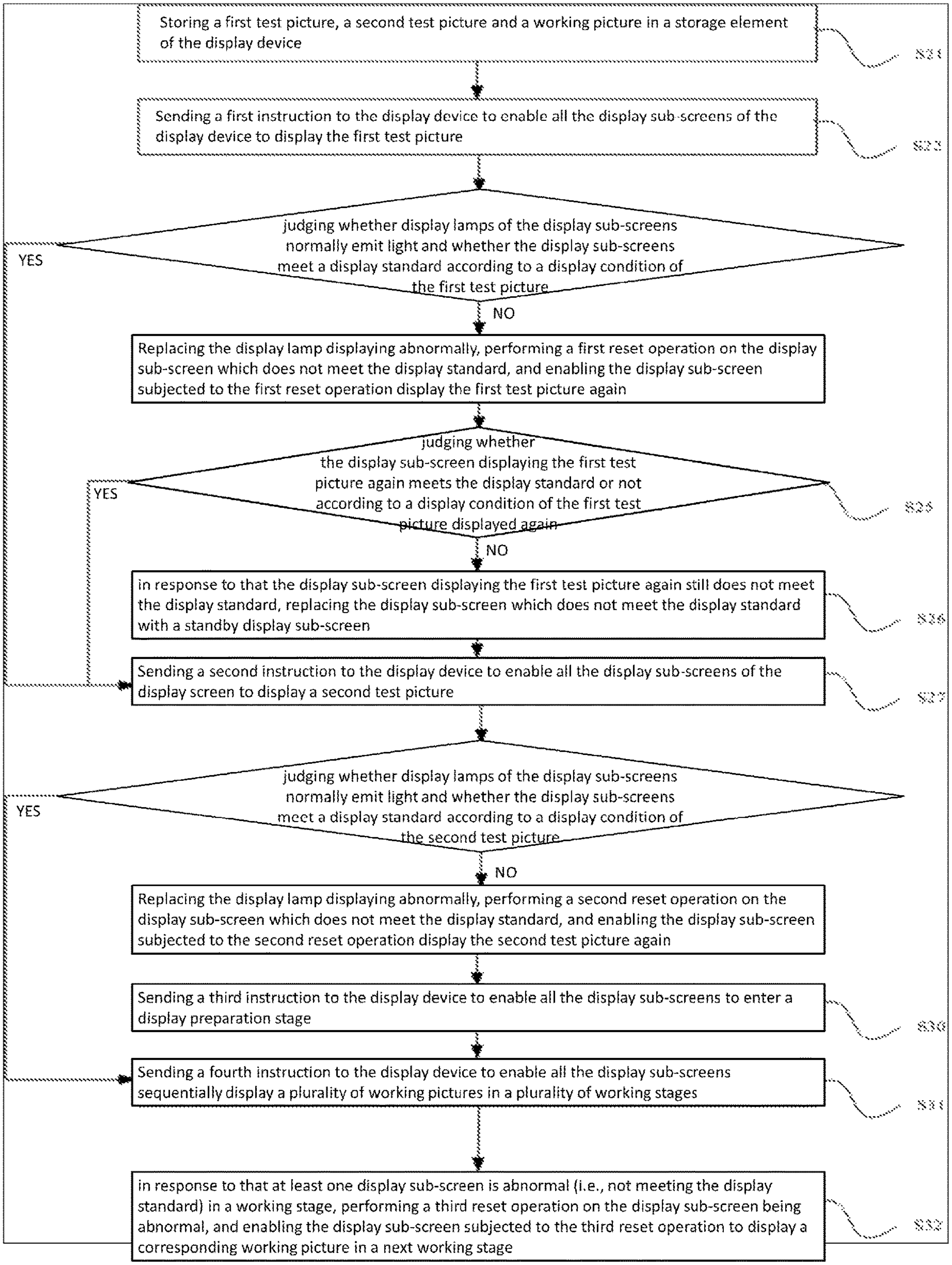
FIG. 2 is another schematic flowchart illustrating a method for detecting a display device according to an embodiment of the present disclosure.
Figure 3:
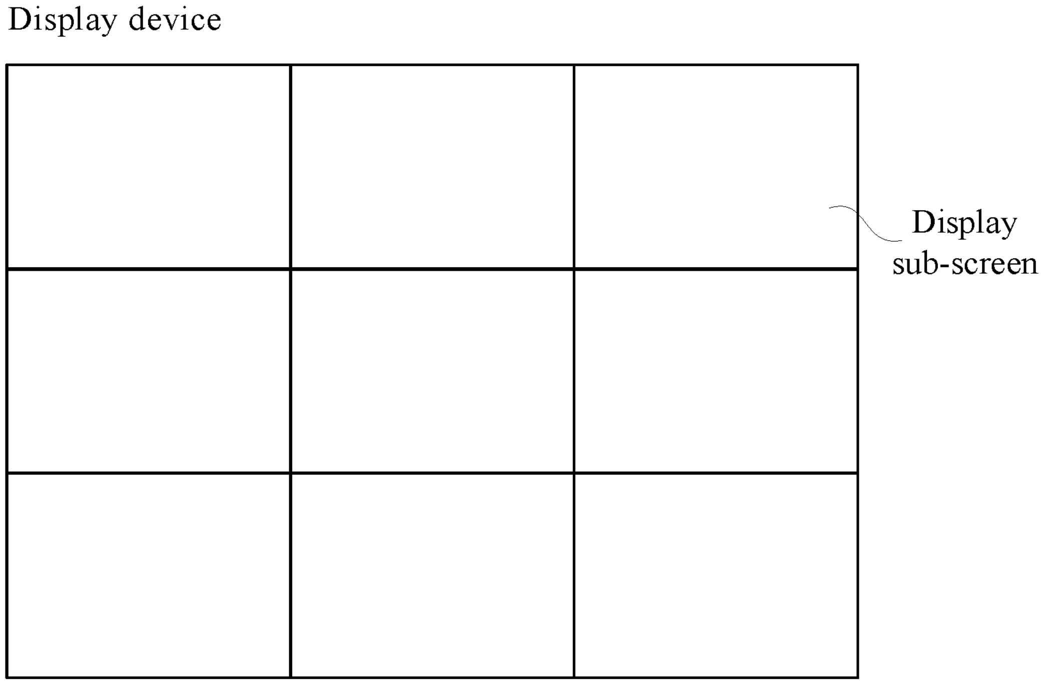
FIG. 3 is a schematic diagram of a display device including display sub-screens according to an embodiment of present disclosure.

As shown in FIG. 2, an embodiment of the present disclosure further provides a method for detecting a display device, where the display device includes a plurality of display sub-screens.

The display device applicable to the method of the embodiment of the present disclosure is composed of the plurality of display sub-screens, namely, each display sub-screen displays a part of a whole picture, and when each display sub-screen displays normally, pictures displayed by all the display sub-screens form the whole picture; and the work of each display sub-screen is relatively independent, namely, whether one of the display sub-screens is normal or not is irrelevant to other display sub-screens.

In some implementations, the display lamp is an LED light bead.

Specifically, the display device may be a transparent LED display device, may be applied to display on glass curtain walls, in shop windows, in large-scale artistic performance and the like, and may be composed of hundreds, thousands or even tens of thousands of display sub-screens.

The following description will be given by taking the display lamp as an LED light bead and the display device as a transparent LED display device as an example.

The method of the embodiment of the present disclosure may include the following steps S21 to S32.

At S21, storing a first test picture, a second test picture and a working picture in a storage element of the display device.

That is, before the first test picture is displayed, the worker stores the first test picture, the second test picture and the working picture in the storage element of the display device. For example, the first test picture, the second test picture, and the working picture are downloaded to the storage element of the display device.

It should be noted that the storage of the second test picture and the working picture may be delayed, and the storage of the second test picture may be performed before the second test picture is displayed, and the storage of the working picture may be performed before the working picture is displayed.

It should be understood that the display device may acquire the first test picture while acquiring the display instruction for displaying the first test picture, acquire the second test picture while acquiring the display instruction for displaying the second test picture, and acquire the working picture while acquiring the display instruction for displaying the working picture.

At S22, sending a first instruction to the display device to enable all the display sub-screens of the display device to display the first test picture.

That is, the first instruction is sent to the display device, so that all the display sub-screens of the display device display a same picture at the same time, namely, the first test picture.

Further, the first instruction may be specifically sent to the display device through a base station.

For example, the worker may control the base station, and wirelessly transmit a control instruction to the base station, so that the base station transmits the first instruction to the display device. Specifically, the base station may be a Lora base station or the like.

At S231, judging whether display lamps of all the display sub-screens normally emit light according to a display condition of the first test picture.

At S232, in response to that at least one display lamp of at least one display sub-screen abnormally emits light, replacing the display lamp abnormally emitting light with a standby display lamp.

Specifically, each display sub-screen may include a plurality of display lamps, each display lamp may be an LED light bead, and whether the display lamp emits light abnormally may be determined by detecting a brightness of light emitted by the display lamp when the display screen displays the first test picture and calculating a difference between the brightness of light emitted by the display lamp and a preset brightness. For example, the preset brightness may be the brightness of light that the display lamp should emit for displaying a preset picture (e.g., the first test picture or the second test picture), and in response to that the difference between the brightness of light emitted by the display lamp and the preset brightness is greater than a third preset value, the display lamp may be regarded as emitting light abnormally.

It should be understood that if the display sub-screen continues to display the same picture, each display lamp of the display sub-screen should respectively continue to have relatively stable light-emitting brightness, so that it is also possible to judge whether the display lamp abnormally emit light by detecting the brightness of light emitted by each display lamp and detecting a change of the brightness of light emitted by each display lamp over time, and in response to that the maximum change of the brightness of light emitted by the display lamp over time is greater than a fourth preset value, it is regarded that the display lamp abnormally emit light.

The third preset value and the fourth preset value may be set as needed, which is not particularly limited by the present disclosure. For example, the minimum difference, which can be perceived by human's eyes, between the brightness of light emitted by the display lamp and the preset brightness may be set as the third preset value described above, and the minimum change, which can be perceived by human's eyes, in the brightness of light emitted by the display lamp may be set as the fourth preset value described above.

If the display sub-screen has the display lamp abnormally emitting light, the standby display lamp can be used to replace the display lamp abnormally emitting light, but the display sub-screen is not replaced, so that the cost can be reduced.

At S241, judging whether all the display sub-screens meet a display standard or not according to a display condition of the first test picture.

The details of this step may refer to the above description for step S12, and are not described herein again.

At S242, in response to that at least one display sub-screen does not meet the display standard, performing a first reset operation on the display sub-screen which does not meet the display standard, and enabling the display sub-screen subjected to the first reset operation to display the first test picture again.

The details of this step may refer to the above description for step S13, and are not described herein again.

At S25, judging whether the display sub-screen displaying the first test picture again meets the display standard or not according to a display condition of the first test picture displayed again.

The details of this step may refer to the above description for step S14, and are not described herein again.

At S26, in response to that the display sub-screen displaying the first test picture again still does not meet the display standard, replacing the display sub-screen which does not meet the display standard with a standby display sub-screen.

That is, in response to that the display sub-screen subjected to the first reset operation still cannot normally display after the first reset operation, it is considered that the display sub-screen is damaged, and thus the display sub-screen can be replaced.

In some implementations, a time to start displaying the first test picture is 13 to 17 minutes prior to a time to start displaying the working picture (e.g., the working picture in step S31).

For example, the time to start displaying the first test picture may be 15 minutes prior to the time to start displaying the working picture (e.g., the working picture in step S31).

That is, the above steps S21 to S26 may be started 13 minutes to 17 minutes (e.g., 15 minutes) before an actual start of working. Such a time interval is appropriate, and on the one hand, the time from the actual start of working is short, and therefore, in such a short time, it is not easy to cause a new problem in the display device, and it is sufficient to perform operations such as resetting and replacement.

The detection at this stage mainly aims at the damage of the LED light beads or the display sub-screen caused by the fact that the display device is carried, installed or placed for too long before.

At S27, sending a second instruction to the display device to enable all the display sub-screens of the display screen to display a second test picture.

For example, the second instruction may be sent to the display device by the base station, so that all the display sub-screens of the display device display a same picture at the same time, that is, the second test picture.

At S281, judging whether the display lamps of all the display sub-screens normally emit light according to a display condition of the second test picture.

That is, after steps S21 to S26, the LED light beads of each display sub-screen are detected again to judge whether they emit light abnormally, so as to detect whether the display lamps are damaged in the previous detection process.

At S282, in response to that at least one display lamp of at least one display sub-screen abnormally emits light, replacing the display lamp abnormally emitting light with a standby display lamp.

The details of steps S281 and S282 may refer to the related description for steps S231 and S232, and are not described herein again.

At S291, judging whether all the display sub-screens meet the display standard or not according to the display condition of the second test picture.

For example, whether the display sub-screen meets the display standard may be determined by comparing an actual display time of the display sub-screen displaying the second test picture with a preset display time of the second test picture, and in response to that a difference between the actual display time of the display sub-screen displaying the second test picture and the preset display time of the second test picture is greater than a first preset value, the display sub-screen may be regarded as not meeting the display standard. Certainly, it may also be determined whether the display sub-screen meets the display standard by comparing an attribute of the picture actually displayed by the display sub-screen with a preset attribute of the second test picture, and in response to that a difference between the attribute of the picture actually displayed by the display sub-screen and the preset attribute of the second test picture is greater than a second preset value, for example, in response to that the difference between a color of the picture actually displayed by the display sub-screen and a preset color of the second test picture is greater than the second preset value, it is determined that the display sub-screen does not meet the display standard.

For example, differences between the actual display times of the display sub-screens when human's eyes perceive that the display sub-screens display the second test picture at the same time may be counted in advance, and an average value of the differences may be used as the first preset value, and in response to that the difference between the actual display time of the display sub-screen displaying the second test picture and the preset display time of the second test picture is greater than the first preset value, the display sub-screen can be regarded as not meeting the display standard; differences between attributes of actual displayed pictures of the display sub-screens when human's eyes perceive that the display sub-screens display the second test picture at the same time may also be considered in advance, an average value of the differences is used as the second preset value, and in response to that the difference between the attribute of the actual displayed picture of the display sub-screen displaying the second test picture and the preset attribute of the second test picture is greater than the second preset value, the display sub-screen is determined not to meet the display standard.

It should be understood that if the display sub-screen does not generate a signal including relevant information such as the actual display time of the display sub-screen displaying the picture and the attribute (for example, color) of the actual displayed picture, it may be that the display sub-screen cannot display and thus the display sub-screen does not meet the display standard.

In addition, picture sizes that the display sub-screens should display may also be considered, and in response to that the picture size that the display sub-screen actually displays is smaller than the picture size that the display sub-screen should display, the display sub-screen does not completely display the second test picture, and does not meet the display standard.

Certainly, one or more factors described above may be considered to judge whether the display sub-screen meets the display standard, which is not specifically limited by the present disclosure.

At S292, in response to that at least one display sub-screen does not meet the display standard, performing a second reset operation on the display sub-screen which does not meet the display standard, and enabling the display sub-screen subjected to the second reset operation to display the second test picture again.

The performing the second reset operation on the display sub-screen that does not meet the display standard may be equivalent to performing a "hot start" on the display sub-screen. Specifically, the present disclosure does not limit a specific manner of performing the second reset operation on the display sub-screen that does not meet the display standard, for example, the second reset operation may be performed on the display sub-screen that does not meet the display standard by a controller of the display device, or the second reset operation may be performed on the display sub-screen that does not meet the display standard by displaying a prompt information through the display device to prompt a worker to press a reset key corresponding to the display sub-screen that does not meet the display standard.

It should be noted that, in steps S22 to S26, the damaged display sub-screen has been replaced, and therefore, if the reason why the display sub-screen displays abnormally (i.e., does not meet the display standard) here is that the display sub-screen crashes or comes down, only the second reset operation needs to be performed on the display sub-screen that displays abnormally, and the display sub-screen may not be replaced.

At S30, sending a third instruction to the display device to enable all the display sub-screens to enter a display preparation stage.

The "display preparation stage" specifically refers to a stage in which all the display sub-screens wait for the working picture to be displayed.

In some implementations, a time to start displaying the second test picture is 1 to 2 minutes prior to a time to start displaying the working picture (e.g., the working picture in step S31). For example, the time to start displaying the second test picture may be 1 minute prior to the time to start displaying the working picture (e.g., the working picture in step S31).

The detection at this stage is mainly directed to the case where the display sub-screen displays abnormally due to erroneous touch or erroneous operation on the display sub-screen in steps S22 to S26.

In the present disclosure, the first and second instructions may be the same or different, and accordingly, the first and second test pictures may be the same or different, and further, the first and second reset operations may be the same or different, each of which is not particularly limited by the present disclosure.

That is, the second test picture may be a pure color picture of a specific color, for example, a pure color picture of white, black, blue, green, red, or yellow, and the color of the second test picture may be the same as or different from that of the first test picture.

At S31, sending a fourth instruction to the display device to enable all the display sub-screens sequentially display a plurality of working pictures in a plurality of working stages.

The working pictures herein refer to pictures to be displayed in regular work (for example, working pictures required for performance display).

At S32, in response to that at least one display sub-screen is abnormal (i.e., not meeting the display standard) in a working stage, performing a third reset operation on the display sub-screen being abnormal, and enabling the display sub-screen subjected to the third reset operation to display a corresponding working picture in a next working stage.

Specifically, when the display device displays the working picture, each display sub-screen should display a preset picture, and in response to that the display sub-screen cannot normally display the preset picture, it is determined that the display sub-screen displays abnormally.

For example, while each display sub-screen displays the working picture, a signal including relevant information such as the actual display time of the display sub-screen displaying the preset picture and the attribute (e.g., color) of the preset picture actually displayed may be generated at intervals (e.g., at preset intervals), and whether or not the display sub-screen displays abnormally may be determined by analyzing the signal.

For example, whether the display sub-screen displays abnormally may be determined by comparing the actual display time of the display sub-screen displaying the preset picture with a preset display time of the preset picture, and in response to that a difference between the actual display time of the display sub-screen displaying the preset picture and the preset display time of the preset picture is greater than a fifth preset value, the display sub-screen may be regarded as displaying abnormally. Certainly, whether the display sub-screen displays abnormally may also be determined by comparing the attribute of the preset picture actually displayed by the display sub-screen with the preset attribute of the preset picture, and in response to that the difference between the attribute of the preset picture actually displayed by the display sub-screen and the preset attribute of the preset picture is greater than a sixth preset value, for example, in response to that the difference between the color of the preset picture actually displayed by the display sub-screen and the preset color of the preset picture is greater than the sixth preset value, it is determined that the display sub-screen displays abnormally.

For example, differences between the actual display times when the display sub-screens display the preset picture and the preset display time of the preset picture, when human's eyes perceive that the actual display times when the display sub-screens display the present picture and the preset display time of the preset picture are the same time, may be counted in advance, and an average value of the differences may be used as the fifth preset value, and in response to that the difference between the actual display time when the display sub-screen displays the preset picture and the preset display time of the preset picture is greater than the fifth preset value, the display sub-screen can be regarded as abnormally displaying; differences between attributes of the preset picture actually displayed by the display sub-screens and the preset attribute of the preset picture, when human's eyes perceive that the attributes of the preset picture actually displayed by the display sub-screens are the same as the preset attribute of the preset picture, may also be counted in advance, and an average value of the differences may be used as the sixth preset value, in response to that the difference between the attribute of the preset picture actually displayed by the display sub-screen and the preset attribute of the preset picture is greater than the sixth preset value, it is determined that the display sub-screen displays abnormally.

It should be understood that if the display sub-screen does not generate, at preset intervals, a signal including relevant information such as the actual display time for display the preset screen and the attribute (e.g., color) of the preset screen actually displayed, it may be that the display sub-screen cannot display, and thus the display sub-screen may be determined as displaying abnormally.

In addition, picture sizes that the display sub-screens should display may be considered, and in response to that the picture size that the display sub-screen actually displays is smaller than the picture size that the display sub-screen should display, it is determined that the display sub-screen does not completely display the preset picture, and thus the display sub-screen abnormally displays.

Certainly, whether the display sub-screen displays abnormally or not may be determined by considering one or more of the above factors, which is not specifically limited by the present disclosure.

When the display sub-screen abnormally displaying is found in the current working stage, the third reset operation may be performed on the display sub-screen abnormally displaying near the end of the current working stage, so that the display sub-screen can normally display in the next working stage, namely, the display sub-screen can display a corresponding working picture in the next working stage.

In the present disclosure, the third reset operation may be the same as the first reset operation and/or the second reset operation, and performing the third reset operation on the display sub-screen may also be equivalent to performing "hot start" on the display sub-screen. Specifically, the present disclosure does not limit a specific manner of performing the third reset operation on the display sub-screen, for example, the third reset operation may be performed on the display sub-screen by a controller of the display device, or the third reset operation may be performed on the display sub-screen by displaying a prompt information through the display device to prompt a worker to press a reset key corresponding to the display sub-screen.

Specifically, for the display device with a large number of display sub-screens, different display sub-screens may correspond to different codes (e.g., 0001, 0010, etc.), so that different display sub-screens may be controlled to perform operations, such as displaying or resetting, by inputting different codes to the display device.

In addition, in steps S31 and S32, the display device is detected while the display device is displaying the working picture. The detection at this stage mainly aims at the display abnormality of the display sub-screen which temporarily appears when the display device displays the working picture, such as the crash of the display sub-screen.

It should be noted that, in the present disclosure, relational terms such as first and second, and the like are used solely to distinguish one entity or action from another entity or action without necessarily requiring or implying any actual such relationship or order between such entities or actions. Also, the terms "include" "comprise" or any other variation thereof, are intended to cover a non-exclusive inclusion, such that a process, method, article, or apparatus that contains a list of elements does not include only those elements but may include other elements not expressly listed or inherent to such process, method, article, or apparatus. Without further limitation, an element defined by the phrase "comprising an . . . " does not exclude the presence of other identical elements in the process, method, article, or apparatus that comprises the element.

In accordance with the embodiments of the present disclosure, as set forth above, these embodiments are not intended to be exhaustive or to limit the present disclosure to the precise embodiments described. Obviously, many modifications and variations are possible in light of the above teaching. The embodiments were chosen and described in order to best explain the principles of the present disclosure and the practical application, to thereby enable others skilled in the art to best utilize the present disclosure and various modifications as are suited to the particular use contemplated. The present disclosure is to be limited only by the claims and their full scope and equivalents.

The invention claimed is:

1. A method for detecting a display device, wherein the display device comprises a plurality of display sub-screens, each of the display sub-screens comprises a plurality of display lamps, and the method comprises:

sending a first instruction to the display device to enable all the display sub-screens of the display device simultaneously display a same first test picture;

judging whether each of the display lamps of each of the display sub-screens normally emits light or not according to a brightness of light emitted by the display lamp, or according to a change of the brightness of light emitted by the display lamp;

in response to that at least one display lamp of at least one display sub-screen abnormally emits light, replacing the display lamp, abnormally emitting light, with a standby display lamp;

judging whether each of the display sub-screens meets a display standard or not according to an actual display time of the display sub-screen for displaying the first test picture and an attribute of an actual display picture of the display sub-screen displaying the first test picture;

in response to that at least one of the display sub-screens does not meet the display standard, performing a first reset operation on the display sub-screen which does not meet the display standard, and enabling the display sub-screen subjected to the first reset operation to display the first test picture again;

judging whether the display sub-screen displaying the first test picture again meets the display standard or not according to an actual display time of the display sub-screen for displaying the first test picture again and an attribute of an actual display picture of the display sub-screen displaying the first test picture again; and in response to that the display sub-screen displaying the first test picture again does not meet the display standard, determining that the display sub-screen displaying the first test picture again is damaged, and replacing the display sub-screen damaged, by using a standby display sub-screen.

2. The method according to claim 1, wherein the judging whether each of the display sub-screens meets the display standard according to an actual display time of the display sub-screen for displaying the first test picture and an attribute of an actual display picture of the display sub-screen displaying the first test picture comprises:

in response to that a difference between an actual display time of the display sub-screen for displaying the first test picture and a preset display time of the first test picture is greater than a first preset value, determining that the display sub-screen does not meet the display standard.

3. The method according to claim 1, wherein the judging whether each of the display sub-screens meets the display standard according to an actual display time of the display sub-screen for displaying the first test picture and an attribute of an actual display picture of the display sub-screen displaying the first test picture comprises:

in response to that a difference between an attribute of an actual display picture of the display sub-screen displaying the first test picture and a preset attribute of the first test picture is greater than a second preset value, determining that the display sub-screen does not meet the display standard.

4. The method according to claim 1, wherein the judging whether each of the display sub-screens meets the display standard according to an actual display time of the display sub-screen for displaying the first test picture and an attribute of an actual display picture of the display sub-screen displaying the first test picture comprises:

in response to that a picture size of the first test picture actually displayed by the display sub-screen is smaller than a preset size of the first test picture, and a difference between the picture size of the first test picture actually displayed by the display sub-screen and the preset size of the first test picture exceeds a preset amount, determining that the display sub-screen does not meet the display standard.

5. The method according to claim 1, wherein the judging whether the display sub-screen displaying the first test picture again meets the display standard according to an actual display time of the display sub-screen for displaying the first test picture again and an attribute of an actual display picture of the display sub-screen displaying the first test picture again comprises:

in response to that a difference between an actual display time of the display sub-screen for displaying the first test picture and a preset display time of the first test picture is greater than a first preset value, determining that the display sub-screen does not meet the display standard.

6. The method according to claim 1, wherein the judging whether the display sub-screen displaying the first test picture again meets the display standard according to an actual display time of the display sub-screen for displaying the first test picture again and an attribute of an actual display picture of the display sub-screen displaying the first test picture again comprises:

in response to that a difference between an attribute of an actual display picture of the display sub-screen displaying the first test picture and a preset attribute of the first test picture is greater than a second preset value, determining that the display sub-screen does not meet the display standard.

7. The method according to claim 1, wherein the judging whether the display sub-screen displaying the first test picture again meets the display standard according to an actual display time of the display sub-screen for displaying the first test picture again and an attribute of an actual display picture of the display sub-screen displaying the first test picture again comprises:

in response to that a picture size of the first test picture actually displayed by the display sub-screen is smaller than a preset size of the first test picture, and a difference between the picture size of the first test picture actually displayed by the display sub-screen and the preset size of the first test picture exceeds a preset amount, determining that the display sub-screen does not meet the display standard.

8. The method according to claim 1, wherein the judging whether each of the display lamps of each of the display sub-screens normally emits light or not according to a brightness of light emitted by the display lamp, or according to a change of the brightness of light emitted by the display lamp comprises:

determining that the display lamp emits light abnormally in response to that a difference between a brightness of light emitted by the display lamp of the display sub-screen and a preset brightness is greater than a third preset value.

9. The method according to claim 1, wherein the judging whether each of the display lamps of each of the display sub-screens normally emits light or not according to a brightness of light emitted by the display lamp, or according to a change of the brightness of light emitted by the display lamp comprises:

determining that the display lamp emits light abnormally in response to that a maximum change of brightness of light emitted by the display lamp of the display sub-screen over time is greater than a fourth preset value.

10. The method according to claim 1, wherein the sending the first instruction to the display device comprises:

sending the first instruction to the display device through a base station.

11. The method according to claim 1, further comprising:

after replacing the display sub-screen damaged with the standby display sub-screen in response to determining that the display sub-screen displaying the first test picture again is damaged, sending a second instruction to the display device to enable all the display sub-screens of the display screen to simultaneously display a same second test picture;

judging whether each of the display lamps of each of the display sub-screens normally emits light or not according to the brightness of light emitted by the display lamp, or according to the change of the brightness of light emitted by the display lamp; and in response to that at least one display lamp of at least one display sub-screen abnormally emits light, replacing the display lamp, abnormally emitting light, with a standby display lamp;

judging whether each of the display sub-screens meets the display standard or not according to an actual display time of the display sub-screen for displaying the second test picture and an attribute of an actual display picture of the display sub-screen displaying the second test picture;

in response to that at least one display sub-screen does not meet the display standard, performing a second reset operation on the display sub-screen which does not meet the display standard, and enabling the display sub-screen subjected to the second reset operation to display the second test picture again; and sending a third instruction to the display device to enable all the display sub-screens to enter a display preparation stage.

12. The method according to claim 11, wherein the judging whether each of the display sub-screens meets the display standard according to an actual display time of the display sub-screen for displaying the second test picture and an attribute of an actual display picture of the display sub-screen displaying the second test picture comprises:

in response to that a difference between an actual display time of the display sub-screen displaying the second test picture and a preset display time of the second test picture is greater than a first preset value, determining that the display sub-screen does not meet the display standard.

13. The method according to claim 11, wherein the judging whether each of the display sub-screens meets the display standard according to an actual display time of the display sub-screen for displaying the second test picture and an attribute of an actual display picture of the display sub-screen displaying the second test picture comprises:

in response to that a difference between an attribute of an actual display picture displayed by the display sub-screen displaying the second test picture and a preset attribute of the second test picture is greater than a second preset value, determining that the display sub-screen does not meet the display standard.

14. The method according to claim 11, wherein the judging whether each of the display sub-screens meets the display standard according to an actual display time of the display sub-screen for displaying the second test picture and an attribute of an actual display picture of the display sub-screen displaying the second test picture comprises:

in response to that a picture size of the second test picture actually displayed by the display sub-screen is smaller than a preset size of the second test picture, and a difference between the picture size of the second test picture actually displayed by the display sub-screen and the preset size of the second test picture exceeds a preset amount, determining that the display sub-screen does not meet the display standard.

15. The method according to claim 11, wherein the judging whether each of the display lamps of each of the display sub-screens normally emits light according to the brightness of light emitted by the display lamp, or according to the change of the brightness of light emitted by the display lamp comprises:

determining that the display lamp emits light abnormally in response to that a difference between a brightness of light emitted by the display lamp of the display sub-screen and a preset brightness is greater than a third preset value.

16. The method according to claim 11, wherein the judging whether each of the display lamps of each of the display sub-screens normally emits light according to the brightness of light emitted by the display lamp, or according to the change of the brightness of light emitted by the display lamp comprises: determining that the display lamp emits light abnormally in response to that a maximum change of brightness of light emitted by the display lamp of the display sub-screen over time is greater than a fourth preset value.

17. The method according to claim 11, further comprising:

after sending the third instruction to the display device to enable all the display sub-screens to enter the display preparation stage, sending a fourth instruction to the display device to enable all the display sub-screens to sequentially display a plurality of working pictures in a plurality of working stages; and in response to that at least one of the display sub-screens displays abnormally in one of the working stages, performing a third reset operation on the display sub-screen displaying abnormally, and enabling the display sub-screen subjected to the third reset operation to display a corresponding one of the working pictures in a next one of the working stages.

18. The method according to claim 17, wherein before the first instruction, the second instruction, and the fourth instruction are sent to the display device, the first test picture, the second test picture, and the plurality of work pictures are stored in a storage element of the display device, respectively.

* * * * *